US011463318B2

(12) United States Patent
Sundaram et al.

(10) Patent No.: US 11,463,318 B2
(45) Date of Patent: *Oct. 4, 2022

(54) EFFICIENCY INDEXES

(71) Applicant: HEWLETT PACKARD ENTERPRISE DEVELOPMENT LP, Houston, TX (US)

(72) Inventors: Venkateswaran Tharuvai Sundaram, Ft. Collins, CO (US); Christopher Michael Carlozzi, Palo Alto, CA (US); Ryan Brandt, Ft. Collins, CO (US); Fredrick M. Roeling, Ft. Collins, CO (US); Eric Soderberg, Palo Alto, CA (US); Roland M. Hochmuth, Ft. Collins, CO (US); Bryan Jacquot, Ft. Collins, CO (US); Travis S. Tripp, Ft. Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 61 days.

This patent is subject to a terminal disclaimer.

(21) Appl. No.: 16/947,919

(22) Filed: Aug. 24, 2020

(65) Prior Publication Data

US 2020/0382380 A1 Dec. 3, 2020

Related U.S. Application Data

(63) Continuation of application No. 15/824,228, filed on Nov. 28, 2017, now Pat. No. 10,756,981.

(51) Int. Cl.
*H04L 12/24* (2006.01)
*G06F 9/50* (2006.01)
(Continued)

(52) U.S. Cl.
CPC ............ *H04L 41/14* (2013.01); *G06F 9/5044* (2013.01); *H04L 43/045* (2013.01);
(Continued)

(58) Field of Classification Search
CPC ......... G06F 9/50; G06F 9/5044; H04L 41/14; H04L 41/22; H04L 43/045; H04L 43/0817; H04L 47/70; H04L 67/10; H04L 67/36

See application file for complete search history.

(56) References Cited

U.S. PATENT DOCUMENTS 7,660,649 B1 * 2/2010 Hope ..................... G06Q 10/04
700/28
8,694,402 B2 * 4/2014 Arnott ................... G06Q 40/06
705/37

(Continued)

FOREIGN PATENT DOCUMENTS

CN 102098686 A * 6/2011
CN 104657220 A 5/2015
KR 10-1702218 B1 2/2017

OTHER PUBLICATIONS

Amazon Web Services, "AWS Cost & Usage Report", available online at <https://web.archive.org/web/20170717144739/https:/aws.amazon.com/aws-cost-management/aws-cost-and-usage-reporting/>, Jul. 17, 2017, 5 pages.

(Continued)

*Primary Examiner* — Kostas J Katsikis
(74) *Attorney, Agent, or Firm* — Hewlett Packard Enterprise Patent Department

(57) ABSTRACT

Example implementations relate to calculating a weighted efficiency index. An example implementation includes fetching a public resource utilization metric and a public cloud resources cost. A private resource utilization metric is collected and a private cloud resources cost is calculated. A (Continued)

weighted efficiency index is calculated from the public cloud resources cost, the private cloud resources cost, or any combination thereof, and a weighted deviation from an ideal resource utilization percentage. The weighted efficiency index may be displayed on a user interface.

20 Claims, 9 Drawing Sheets

(51) Int. Cl.
| | |
|---|---|
| H04L 12/911 | (2013.01) |
| H04L 29/08 | (2006.01) |
| H04L 12/26 | (2006.01) |
| H04L 41/14 | (2022.01) |
| H04L 47/70 | (2022.01) |
| H04L 67/10 | (2022.01) |
| H04L 43/0817 | (2022.01) |
| H04L 43/045 | (2022.01) |
| H04L 67/75 | (2022.01) |
| H04L 41/22 | (2022.01) |

(52) U.S. Cl.
CPC .......... *H04L 43/0817* (2013.01); *H04L 47/70* (2013.01); *H04L 67/10* (2013.01); *H04L 67/75* (2022.05); *H04L 41/22* (2013.01)

(56) References Cited

U.S. PATENT DOCUMENTS

| | | | |
|---|---|---|---|
| 9,128,773 | B2 | 9/2015 | Beaty et al. |
| 9,497,136 | B1 | 11/2016 | Ramarao et al. |
| 9,560,037 | B2 | 1/2017 | Bartz et al. |
| 9,672,074 | B2 | 6/2017 | Gaurav et al. |
| 10,261,815 | B2 | 4/2019 | Gaurav et al. |
| 10,346,775 | B1 | 7/2019 | Xu et al. |
| 2011/0231899 | A1 | 9/2011 | Pulier et al. |
| 2011/0270968 | A1 | 11/2011 | Salsburg et al. |
| 2012/0324445 | A1 | 12/2012 | Dow et al. |
| 2013/0185413 | A1 | 7/2013 | Beaty et al. |
| 2013/0198050 | A1 | 8/2013 | Shroff et al. |
| 2013/0268940 | A1 | 10/2013 | Gmach et al. |
| 2014/0019415 | A1 | 1/2014 | Barker et al. |
| 2014/0129483 | A1 | 5/2014 | Isaev et al. |
| 2014/0164612 | A1 | 6/2014 | Hillier |
| 2014/0207944 | A1 | 7/2014 | Emaru |
| 2014/0278808 | A1 | 9/2014 | Iyoob et al. |
| 2014/0365662 | A1 | 12/2014 | Dave et al. |
| 2015/0222702 | A1 | 8/2015 | Salle et al. |
| 2016/0042031 | A1 | 2/2016 | Bertram et al. |
| 2016/0055023 | A1 | 2/2016 | Ghosh et al. |
| 2016/0055038 | A1 | 2/2016 | Ghosh et al. |
| 2016/0057073 | A1 | 2/2016 | Steinder et al. |
| 2016/0119357 | A1 | 4/2016 | Kinsella et al. |
| 2017/0063720 | A1 | 3/2017 | Foskett et al. |
| 2017/0109212 | A1 | 4/2017 | Gaurav et al. |
| 2017/0142452 | A1 | 5/2017 | Bae et al. |
| 2017/0242717 | A1 | 8/2017 | Gaurav et al. |
| 2017/0262911 | A1 | 9/2017 | Jagannath |
| 2018/0173567 | A1 | 6/2018 | Olshefski et al. |
| 2019/0123960 | A1 | 4/2019 | Maiya et al. |
| 2019/0166007 | A1 | 5/2019 | Sundaram et al. |

OTHER PUBLICATIONS

Chris Risner, "Announcing the release of the Azure Usage and Billing Portal", available online at >https://azure.microsoft.com/en-us/blog/announcing-the-release-of-the-azure-usage-and-billing-portal/>, Microsoft Azure, Jul. 14, 2016, 6 pages.
Datadog©, "Real-time interactive dashboards", available online at <https://web.archive.org/web/20171004205148/https://www.datadoghq.com/dashboarding/>, Oct. 4, 2017, 7 pages.
Gil Haberman, "App Centric Infrastructure for Any Cloud," available online at <https://www.nutanix.com/2017/06/28/app-centric-infrastructure-cloud/>, Nutanix, Jun. 28, 2017, pp. 1-6.
HPE Teachnology, "Project New Hybrid IT Stack demo", https://www.youtube.com/watch? v=4jml3B9pdSA, Published on Jul. 12, 2017, 5 pages.
IBM, "IBM Cloud Brokerage Managed Services—Cost and Asset Management," available online at <https://www.Ibm.com/ae-en/marketplace/cloud-brokerage-cam/details>, retrieved on Oct. 10, 2017, pp. 1-4.
International Search Report and Written Opinion received for PCT Application No. PCT/US2018/062844, dated Mar. 18, 2019, 13 pages.
Mittal, S., et al.; "Managing Cost Related to Usage of Cloud Resources"; U.S. Appl. No. 15/564,549, filed Oct. 5, 2017, pp. 1-19.
Netapp, "OnCommand Insight Monitor and Manage Your Multivendor Hybrid Cloud it Infrastructure," available online at <http://www.netapp.com/us/products/data-infrastructure-management/oncommand-insight-bi.aspx>, retrieved on Oct. 10, 2017, pp. 1-14.
New Relic®, "New Relic Insights" available online at <http://web.archive.org/web/20170705111835/https:/docs.newrelic.com/docs/insights>, Jul. 5, 2017, 2 pages.
Posey et al., "Tracking EC2 Instance Usage with AWS Reporting Engines", available online at "https://awsinsider.net/articles/2017/09/18/aws-ec2-reporting-engines.aspx", Sep. 18, 2017, 5 pages.
ServiceNow Support, "Introduction to Performance Analytics", (Transcript), available online at <https://youtu.be/64TPCVeaV9o? t=159>, Aug. 14, 2019, 13 pages.
ServiceNow, "ServiceNow It Operations Management," ServiceNow Documentation, Istanbul, Aug. 1, 2017, pp. 1-200.
Shilpi Gautam, "Announcing General Availability of Consumption and Charge APIs for Enterprise Azure customers", available online at <https://azure.microsoft.com/en-us/blog/announcing-general-availability-of-consumption-and-charge-apis-for-enterprise-azure-customers/>, Microsoft Azure, Aug. 1, 2017, 5 pages.
Zhang et al., "Monitor and manage your costs with Cloud Platform billing export to BigQuery", Google Cloud Platform, available online at <https://cloud.google.com/blog/products/gcp/monitor-and-manage-your-costs-with?, Nov. 15, 2017, 5 pages.

\* cited by examiner

EFFICIENCY INDEXES

BACKGROUND

Cloud-based computing architectures enable delivery of computing as a service, whereby a shared pool of configurable computing resources may be provided as a service to computing devices. The resources may be located remotely or locally, and may be shared over a computer network. Cloud computing may facilitate services such as Infrastructure-as-a-Service (IaaS), Platform-as-a-Service (PaaS), Software-as-a-Service (SaaS), etc. Example cloud architectures may include a public cloud system, a private cloud system, and a hybrid cloud system. A hybrid cloud system, for example, may include a composition of two or more cloud systems that can remain unique but may be bound together.

BRIEF DESCRIPTION OF THE DRAWINGS

Certain examples are described in the following detailed description and in reference to the drawings, in which.

DETAILED DESCRIPTION

Figure 1:
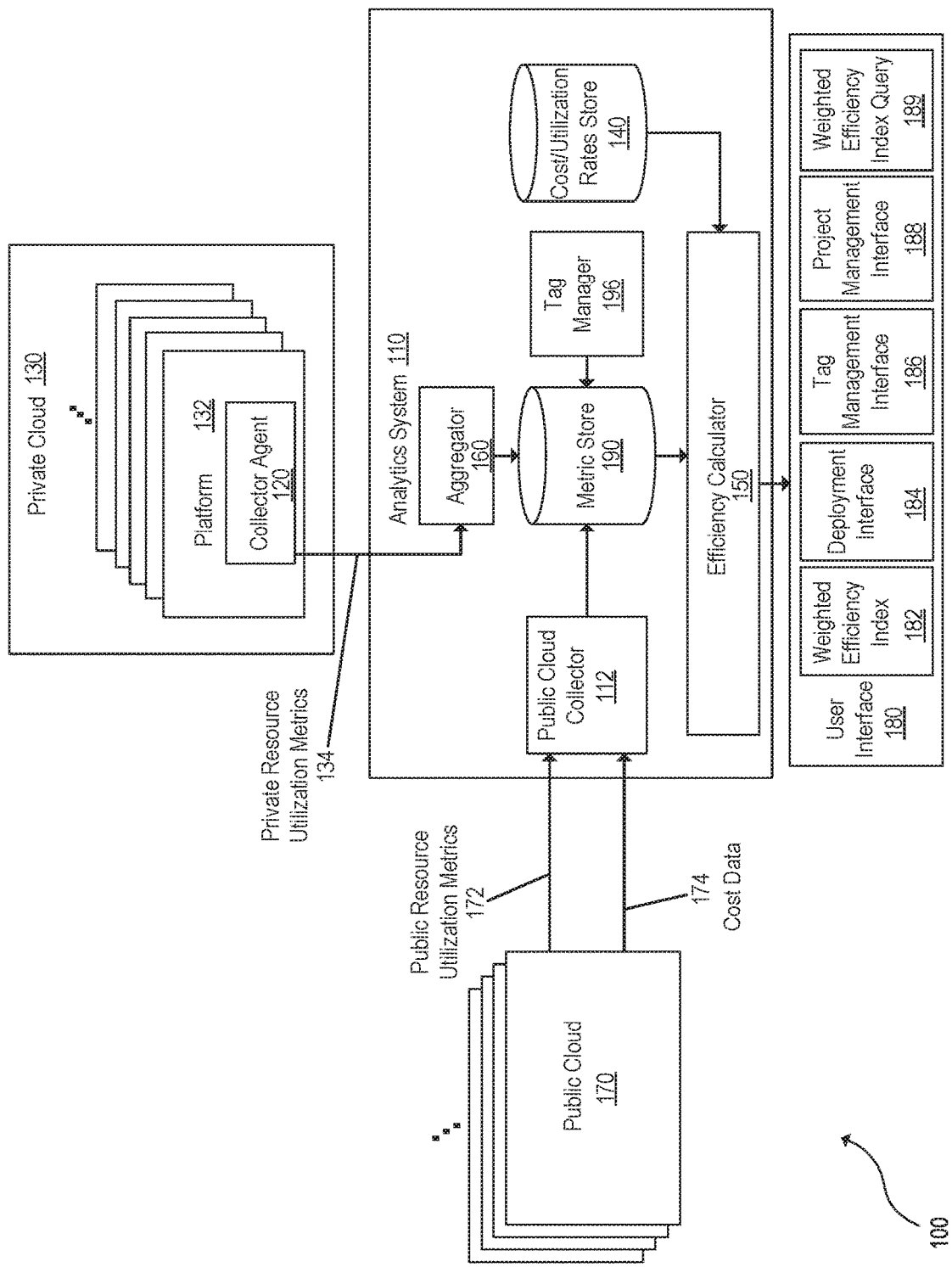
FIG. 1 is an example system for providing a weighted efficiency index to a user for hybrid cloud management.

Cloud service resources may be provisioned within a cloud infrastructure and workloads may be run in the cloud, be it a public cloud, a private cloud, or a mix of both public cloud and private cloud-such as in a hybrid cloud system. A hybrid cloud system may be utilized to decrease costs for an enterprise (e.g. business and organization), and/or to provide fault tolerance and scalability of cloud based services.

An example private cloud may be a cloud infrastructure operated by an enterprise, and may be deployed on-premise, i.e. on the physical premises of the enterprise. A private cloud may be managed by the enterprise or a third party. A private cloud may reside on a company's intranet or hosted data center and may host data more securely than a public cloud.

An example public cloud may be cloud infrastructure made available to the general public or an industry group and is owned by an organization. Resources in a public cloud may be provisioned on a self-service basis over a network, via web applications and/or web services, from an off-site third-party provider that bills on a utility computing basis. Data is stored in the data center of the public cloud provider, and the provider may be responsible for the maintenance and management of the data center. A public cloud may offer greater resource flexibility for handling changeable workloads than a private cloud.

A hybrid cloud is a cloud infrastructure that includes a combination of private cloud and public cloud services. A hybrid cloud system may enable orchestration between a private cloud and a public cloud platform, such that workloads may be moved between private and public clouds to account for computational and/or cost efficiencies, for example. Hybrid cloud systems may thus balance enterprise demands for security and flexibility.

Hybrid cloud users may deploy cloud resources and run workloads in both public and private clouds. However, resources in either a public or private cloud may be over utilized or underutilized. Additionally, an enterprise may experience greater operational costs because resources may not be allocated between a public cloud and/or a private cloud in a cost effective manner. As the utilization of public and/or private cloud resources scale to large numbers, it may be increasingly difficult or impractical to understand how efficiently resources are utilized. Thus, a management portal that provides transparency into how efficiently resources are allocated between a public or private cloud may be desirable.

Providing a management portal to a user indicating how efficiently resources are utilized presents a technical challenge. Resource utilization in a public or private cloud may be measured by a number of different system metrics tracking the allocation or utilization of any number of cloud resources. Furthermore, metrics of different clouds may be non-analogous, and private and public clouds may include different cost models. A public cloud provider, for instance, may charge an enterprise for the number of resources utilized or allocated at a given time. Conversely, the cost of a private cloud to an enterprise may include the cost of the physical private cloud infrastructure, as well as the costs to manage, maintain, and otherwise keep the physical private cloud infrastructure operating.

A solution is provided for delivering to a user a weighted efficiency index for determining how efficiently cloud resources are allocated between public and private clouds. Specifically, a public weighted efficiency index indicating a relative public cloud efficiency and a private weighted efficiency index indicating a relative private cloud efficiency may be calculated. A public weighted efficiency index may be calculated from a public cloud resources cost indicating usage of a public resource in a public cloud and a public resource utilization metric indicating a usage of the public resource in the public cloud. The public cloud resources cost and the public resource utilization metric may be fetched from an on-boarded public cloud.

The private weighted efficiency index may be calculated from a private cloud resources cost indicating usage of a private resource in a private cloud and a private resource utilization metric indicating a usage of the private resource in the private cloud. The private resource utilization metric may be collected, and may be combined with a cost to private utilization ratio to calculate the private cloud resources cost.

A weighted efficiency index may be determined from the public cloud resources cost, the private cloud resources cost, or any combination thereof, and a weighted deviation from an ideal resource utilization percentage as determined by the public resource utilization metric, the private resource utilization metric, or any combination thereof as will be described in greater detail below. The calculated weighted efficiency index may be subsequently displayed on a user interface and/or utilized to more efficiency manage resources between clouds.

FIG. 1 is a system 100 for providing a weighted efficiency index to a user for hybrid cloud management. FIG. 1 includes a public cloud collector 112 for fetching any number of public resource utilization metrics 172 from a public cloud. As illustrated in FIG. 1, any number of public clouds 170 may be on-boarded into analytics system 110. On-boarding a public cloud within analytics system 110 may include connecting the public cloud to analytics system 110 by entering secure credentials associated with the public cloud into analytics system 110, such as a master key, login credentials, etc.

On-boarding a public cloud within analytics system 110 may grant analytics system 110 access permissions to the on-boarded public cloud. In some implementations, on-boarding a public cloud within analytics system 110 may grant analytics system 110 management permissions to migrate workloads, provision, read, update, create, and/or remove resources such as containers and/or virtual machines from the public cloud. The public cloud may be managed by a user through deployment interface 184 of user interface 180, or may be dynamically and automatically managed by analytics system 110 responsive to a determined efficiency index as will be described in greater detail herein.

On-boarding a public cloud within analytics system 110 may grant analytics system 110 access to data generated within the on-boarded public cloud and may enable public cloud collector 112 of analytics system 110 to fetch data from public cloud 170, including any number of public resource utilization metrics 172 and cost data associated with of the public resource usage 174. The public resource utilization metrics 172 may be fetched periodically and may indicate a usage of public resources in a public cloud over time. For example, a public resource metric may include how many virtual machines are allocated in the public cloud and for what length of time the virtual machines were utilized; how much memory, and/or processing resources were utilized by each allocated virtual machine in the public cloud; how much data was sent and/or received by an allocated virtual machine in the public cloud; a combination thereof; and/or other factors related to resources utilized in a public cloud.

Public cloud collector 112 may also fetch cost data 174 from on-boarded public clouds. The cost data 174 may indicate a cost of public resources utilized in public cloud 170 as may be indicated by the public resource utilization metrics 172. In an example, the cost data 174 may be collected by public cloud collector 112 periodically, and may include billing reports from a public cloud provider providing the public cloud services. The billing reports may include costs for each virtual machine allocated, costs for networking data sent and/or received by each allocated virtual machine, costs for processing resources utilized, etc. Accordingly, public cloud collector 112 may collect data from on-boarded public clouds that indicate a usage of public cloud resources, and a cost associated with the public cloud resource usage.

In some implementations, data that indicates a usage of private cloud resources may also be collected. The data may be collected by collector agents 120 which, in an example, may be deployed in each platform 132 of private cloud 130. Platforms 132 may include physical computers, servers, and/or nodes of private cloud 130, and/or virtual machines of private cloud 130. Platforms 132 may also be containers running directly on physical computers, servers and/or nodes of private cloud 130 or within virtual machines of private cloud 130. In another example, the collector agents 120 may be included in analytics system 110 and may fetch data from platforms 132. Collector agents 120 may be implemented as hardware or a combination of hardware and software/firmware for collecting data associated with cloud resource usage from private cloud 130. For example, hardware as referred to herein may include electronic circuitry or logic, or a processing resource, such as a microcontroller, a microprocessor, central processing unit (CPU) core(s), an application-specific integrated circuit (ASIC), a field programmable gate array (FPGA). Software or firmware as referred to herein may include executable instructions stored on a non-transitory machine-readable medium such as random access memory (RAM), read-only memory (ROM), electrically erasable programmable read-only memory (EEPROM), flash memory, a hard disk drive, etc., and may be executed by hardware.

Collector agents 120 may collect private resource utilization metrics 134 from private cloud 130. The private resource utilization metrics 134 may indicate a usage of private cloud resources, which may include how many platforms 132 are allocated in the private cloud and for what length of time the platforms 132 were utilized; how much memory, and/or processing resources were utilized by each allocated platform 132 in the private cloud; how much data was sent and/or received by an allocated platform 132 in the private cloud; a combination thereof; and/or other factors related to resources utilized in a private cloud.

Private resource utilization metrics 134 collected by collector agents 120 may be aggregated by aggregator 160. For example, a collector agent may be deployed within each platform 132 of private cloud 130. Each collector agent 120 may collect a private resource utilization metric of the platform 132 in which it is deployed. Aggregator 160 may aggregate like private resource utilization metrics together, and store the aggregated resource utilization metric within metric store 190. Collector agents 120 may collect a plurality of metrics periodically from a multitude of platforms, and aggregator 160 may combine metrics of platforms based on common metrics and/or commonalties shared by the platforms. For example, aggregator 160 may combine private resource utilization metrics 134 of virtual machines offered by a common provider, or of a common zone or geographical region.

In an example, aggregator 160 may strip the private resource utilization metrics 134 collected by collector agents 120 of individual platform identifiers and once aggregated, may assign the aggregated metrics an aggregate identifier. For instance, aggregator 160 may aggregate the amount of memory each virtual machine of a particular region utilizes within a period of time, and may assign the aggregated value an identifier from virtual machines of the particular region in the aggregate. By aggregating metrics, the amount of data stored within metric store 190 may be efficiently managed. Aggregator 160 enables resource utilization metrics of multiple platforms to be aggregated as a whole resource utilization metric, such that data indicating the utilization of resources across regions, zones, projects, etc., may be stored. Aggregator 160 may be implemented as hardware or a combination of hardware and software/firmware for aggregating private resource utilization metrics 134.

A private cloud resources cost may be calculated from private resource utilization metrics (e.g., 132, stored to metric store 190) and cost to private utilization ratios. A cost to private utilization ratio may indicate a rate of cost for a particular resource. The cost to private utilization ratio may be stored within cost to utilization rates store 140 and in an example, may be inputted by a user, e.g. through user interface 180. For example, a user may specify a cost rate of each platform 132 allocated, or may otherwise specify a cost rate for each of memory usage, processor usage, and network data usage, or cost rates associated with other resources utilized within private cloud 130. In some implementations, a user may input other cost rates for running a private cloud infrastructure, including energy costs over time, real estate costs over time, etc., which may be stored within cost to utilization store 140.

Efficiency calculator 150 may calculate a private cloud resources cost from the cost to private utilization ratios and the private resource utilization metrics. Efficiency calculator 150 may be implemented as hardware or a combination of hardware and software/firmware. Efficiency calculator 150 may combine cost rates stored within cost to utilization rates store 140 and private resource utilization metrics 134 collected by collector agents 120 to calculate a private cloud resources cost. For instance, collector agents 120 may collect a private resource utilization metric 134 which specifies how many platforms were allocated within a period time of collection. The private resource utilization metric 134 may be stored in metric store 190 and passed thereafter to efficiency calculator 150. Cost to utilization rate store 140 may pass a cost for each platform allocated within a period of time to efficiency calculator 150, and efficiency calculator 150 may calculate a private cloud resources cost from the passed data. For instance, the product of private cloud resources costs and respective cost to private utilization ratios may be calculated.

In addition to calculating a private cloud resources cost, efficiency calculator 150 may calculate a public weighted efficiency index for a public cloud 170 and/or a private weighted efficiency index for a private cloud 130. A weighted efficiency index may indicate a relative utilization efficiency of resources on a public cloud, private cloud, or combination thereof. A public weighted efficiency index may be determined from the public cloud resources cost data 174 and a deviation from an ideal resource utilization percentage as determined by the public resource utilization metrics 172. Similarly, a private weighted efficiency index may be determined from the private cloud resources cost data calculated by efficiency calculator 150, and a deviation from an ideal resource utilization percentage as determined by the private resource utilization metrics 134. Determination of a deviation from an ideal resource utilization percentage will now be described, and then determination of a public or private weighted efficiency index will be described.

An ideal resource utilization percentage may be a predetermined percentage of resources that is ideally utilized by a system to maximize system efficiencies. As illustrative examples, a desired state of an allocated virtual machine may be a 75% utilization of a central processing unit (CPU) resource of the virtual machine, an 80% utilization of a storage resource of the virtual machine, and an 80% utilization of a memory resource of the virtual machine. Although three such example resources are provided, a system may have any number, and/or any combination of predetermined ideal resource utilization percentages.

A lower resultant efficiency score may be determined from a resource utilization metric that more greatly deviates from an ideal resource utilization percentage. For example, it may be determined from a resource utilization metric that an average of 75% of a first virtual machine memory resource is utilized at a particular time and an average of 70% of a second virtual machine memory resource is utilized at the particular time, where an ideal resource utilization percentage for the virtual machine memory resource is 80%. In this example, a lower efficiency score may result from the second virtual machine memory resource than first virtual machine memory resource because the second virtual machine memory resource more greatly deviates from the ideal resource utilization percentage.

In some implementations, the resource utilization percentages of platforms of a like region, zone, cloud source, etc., may be averaged together such that an aggregate resource utilization percentage is obtained. Thus, from the example illustrated above, the first virtual machine memory resource percentage of 75% may be averaged with the second virtual machine memory resource of 70% to result in an aggregate efficiency score of 72.5% and an efficiency score may result in part from the ideal resource utilization percentage deviation.

The greater a resource utilization percentage deviates from an ideal utilization percentage, the lower the efficiency score that may result. However, averaging resource utilization percentages together dilutes atypical resource utilization percentages of platforms that are significantly under or over utilized with respect to a particular resource utilization. To accentuate the under/over utilization of resources of these platforms, resource utilization percentages that more greatly deviate from an ideal resource utilization percentage may be weighted.

Specifically, a weight function that more greatly penalizes resource utilization percentages that deviate further from an ideal resource utilization percentage may be applied to each resource utilization percentage before the resource utilization percentages are aggregated. For instance, where an ideal resource utilization percentage is 80%, the efficiency score of an aggregation of 60% and 70% resource utilization percentages may be higher than an efficiency score of an aggregation of 55% and 75% resource utilization percentages because the resource utilization percentage of 55% most greatly deviates from the ideal resource utilization percentage of 80% and thus is weighted most heavily. The weight function may be linear, or the weight function may be any number of other functions that more greatly penalize deviating resource utilization percentages. Another example weight function may include the logistic function $$l(x) = \frac{L}{1 + e^{-k*(x-x_0)}}$$

where L, k, and $x_0$ may be any fixed parameters, and x may be a resource utilization percentage normalized to a value between a fixed range.

In some implementations, the weighting of resource utilization percentages that more greatly deviate from an ideal resource utilization percentage may be achieved by weighting the resource utilization percentages with the inverse of the resource utilization percentages. For instance, weights normalized within a fixed range may be calculated with the equation $$w_i = \frac{1 - u_i}{\|1 - u_i\|_1},$$

where $w_i$ is a weight vector and $u_i$ is a utilization vector derived from a resource utilization percentage. For instance, a utilization vector may be a value translated from the resource utilization percentage and fixed within a range of values. Weighted efficiency indexes may be calculated by calculating the dot product of each utilization vector and each respective weight and summing the dot products. For example, the dot product of a memory utilization vector, the dot product of a storage utilization vector, and the dot product of a central processing unit (CPU) utilization vector may be summed. Thus, a weighted efficiency index may be an aggregation of different types of weighted resource utilization metrics.

The weighted efficiency index, i.e. a public weighted efficiency index, a private weighted efficiency index, or a weighted efficiency index that includes both public and/or private resource costs and/or resource utilization metrics, may be determined from a cloud resources cost in addition to the weighted deviation from the ideal resource utilization percentage described above. For calculating the public weighted efficiency index, public cloud resources cost 174 fetched by public cloud collector 112 may be utilized. For calculating the private weighted efficiency index, the private cloud resources cost may be utilized.

In an example, the weighted efficiency index may be calculated by multiplying the resource cost of each respective resource with each respective resultant efficiency score as determined from the aggregated weighted deviations from the ideal resource utilization percentage. For example, a resultant efficiency score for memory may be calculated from the memory utilization percentages of a group of virtual machines, a resultant efficiency score for storage may be calculated from the storage utilization percentages of the group of virtual machines, a resultant efficiency score for central processing unit (CPU) utilization may be calculated from the CPU utilization percentages of the group of virtual machines, etc. The resultant efficiency scores may be aggregated, e.g. summed, to generate the weighted efficiency index.

Prior to being aggregated, the resultant efficiency scores may additionally be weighted by cloud resource costs. Building on the formula described above, the normalized weights may be calculated with equation $$w_i = \frac{c_i * (1 - u_i)}{\|c_i * (1 - u_i)\|_1},$$

where $c_i$ is a cost of a respective utilized resource. Thus, under or over utilized resources of high costs may more negatively impact a weighted efficiency index than under or over utilized resources of lesser costs.

A public weighted efficiency index may be calculated from the resultant efficiency scores as determined from the public resource utilization percentages multiplied by respective public resource costs, whereas a private weighted efficiency index may be calculated from the resultant efficiency scores as determined from the private resource utilization percentages multiplied by respective private resource costs. In an example, the aggregated efficiency indexes may be normalized to scale within a fixed range.

Figure 2:
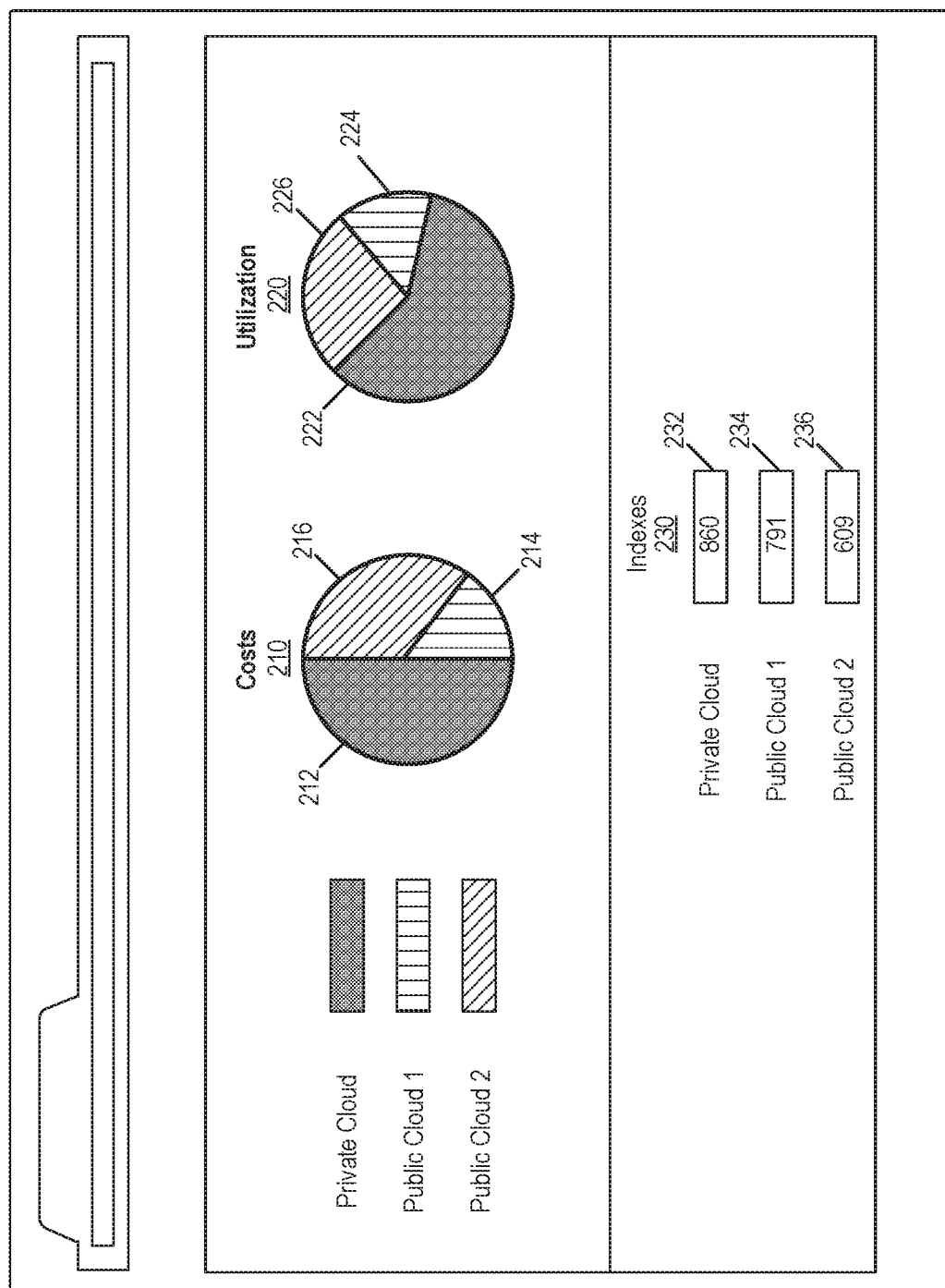
FIG. 2 illustrates an example user interface for displaying a weighted efficiency index.

A public and/or private weighted efficiency index 182 may be displayed on user interface 180 in addition to cost and resource utilization data, as will now be illustrated with reference to FIG. 2. FIG. 2 illustrates an example user interface 200 for displaying a public and/or private weighted efficiency index as well as cost and resource utilization data from which the public weighted efficiency index and private weighted efficiency index are calculated. User interface 200 may be displayable on a web browser over a local area network (LAN) or wide area network (WAN) such as the internet, or may be displayed locally, e.g. on a display connected to analytics system 110 of FIG. 1.

Cost data 210 of a private cloud provider and each on-boarded public cloud provider may be displayed on user interface 200. FIG. 2 illustrates cost data of an example private cloud and two example public clouds, cost data 214 of example public cloud 1 and cost data 216 of example public cloud 2 respectively; however, different numbers of private and/or public clouds may be displayed in different example scenarios. As an example, referring to FIG. 1, public cost data 174 collected by public cloud collector 112 and/or private cost data calculated by efficiency calculator 150 as described above may be displayed on example user interface 200.

As illustrated on example user interface 200, public cost data and private cost data may be separated according to the public and/or private cloud the cost data is associated with. Public cost data and private cost data may be aggregated by respective cloud and displayed accordingly. For instance, public cost data 174 may be separated on user interface 200 into cost data 214 from public cloud 1 and cost data 216 from public cloud 2. Cost data 210 is displayed as a pie chart to illustrate the relative percentage of costs of each cloud, however cost data 210 may be depicted in any form to illustrate the respective costs of each public and/or private cloud.

Resource utilization data 220 of a private cloud provider and each on-boarded public cloud provider may be displayed on user interface 200. FIG. 2 illustrates resource utilization data of an example private cloud and two example public clouds, resource utilization data 224 of example public cloud 1 and resource utilization data 226 of example public cloud 2 respectively; however, any number of private and/or public clouds may be displayed. As an example, referring to FIG. 1, public resource utilization metrics 172 collected by public cloud collector 112 and/or private resource utilization metrics collected by collector agents 120 as described above may be displayed on example user interface 200.

As illustrated on example user interface 200, public resource utilization data and private resource utilization data may be separated according to the public and/or private cloud with which the cost data is associated. Public resource utilization metrics and private resource utilization metrics may be aggregated by respective cloud and displayed as public resource utilization data and private resource utilization data. For instance, public resource utilization metrics 172 may be separated on user interface 200 into resource utilization data 224 from public cloud 1 and resource utilization data 226 from public cloud 2. Resource utilization data 220 is displayed as a pie chart to illustrate the relative percentage of costs of each cloud, however resource utilization data 220 may be depicted in any form to illustrate the respective costs of each public and/or private cloud.

Public and/or private weighted efficiency indexes calculated, e.g. by efficiency calculator 150 of FIG. 1, may be displayed on user interface 180 of FIG. 1, or user interface

200 of FIG. 2. Example weighted efficiency indexes 230 are displayed on example user interface 200. In this example, a private weighted efficiency index 232 having a displayed weighted efficiency index of 860 and a public weighted efficiency index for each on-boarded public cloud is illustrated, e.g. public weighted efficiency index 234 of public cloud 1 having a displayed weighted efficiency index of 791 and public weighted efficiency index 236 of public cloud 2 having a displayed weighted efficiency index of 609 respectively. However, any number of private and/or public cloud weighted efficiency indexes may be displayed. The displayed private cloud and public cloud weighted efficiency indexes may indicate how efficiently resources of a public and/or private cloud are utilized relative to cost.

Returning to FIG. 1, weighted efficiency indexes indicating the relative efficiency of resources spanning multiple clouds may also be calculated and displayed on user interface 180 of FIG. 1. By assigning tags to resources and/or assigning project identifiers (also referred to as workspace identifiers) to resources across clouds, the relative utilization efficiencies of resources of different parameters may be determined. Tag manager 196 may assign tags and/or project identifiers to public and/or private cloud resource and may assign tags and/or project identifiers to public and/or private cloud resource data stored within metric store 190. Tag manager 196 may be implemented as hardware or a combination of hardware and software/firmware.

User interface 180 may include a tag management interface 186 to enable a user to control tag manager 196 to assign tags and/or project identifiers to public and/or private cloud resources. Through tag management interface 186, a user may read, update, and delete tags. In some implementations, tag manager 196 may assign tags to resources according to rules and a user, through tag management interface 186, may generate rules for tag manager 196 to assign tags to resources. In an example, public cloud collector 112 may enrich public cost data 174 and/or public resource utilization metric 172 with tags based on the generated rules. Received private resource utilization metrics 134 may similarly be enriched with tags. In some implementations, tag manager 196 may enrich public cost data 174, public resource utilization metric 172, private resources utilization metrics 134, and/or private cost data with tags subsequent to the data being stored in metric store 190.

Tags may include metadata having a key and value for managing and categorizing resources. A tag key may be a particular classifier to identify a topic, category, feature type, and/or other user or system defined classifier for identifying resources. For example, a tag key may be a line of business, an environment, a priority, etc. A tag may include any number of tag values. The tag values fit within the scope of the key, and may include, for example, a particular business division, an environment type such as a test environment or a development environment, a strength of priority, etc.

A project (also referred to as a workspace) is a logical grouping of users, resources, and/or tags that may span any number of clouds. In an example, a user assigned to a particular project may have limited permissions and may be limited to accessing, managing, and/or provisioning resources, and/or reading, updating, and/or removing containers and/or platforms associated with the project to which the user is assigned. Thus, different users assigned to different projects may have different permissions within deployment interface 184 and may access and/or manage the deployment lifecycles of different resources.

A resource may be associated with a project where the resource is assigned a project identifier associated with the project. In some implementations, a project identifier may be assigned to a resource responsive to the provisioning of the resource. In some implementations, tag manager 196 may be instructed manually by a user, through project management interface 188 of user interface 180, to assign project identifiers to resources. For example, through project management interface 188 a user may create, read, update, delete, and/or otherwise manage projects. Access to project management interface 188 may be granted to users with secure access permissions. Tag manager 196 may also map tags to projects according to rules. A user may create rules through project management interface 188 for mapping tags to projects such that resources assigned a tag mapped to a particular project may be allocated to that project.

As described above, efficiency calculator 150 may calculate a public weighted efficiency index indicating the relative utilization efficiency of resources in a public cloud and a private weighted efficiency index indicating the relative utilization efficiency of resources in a private cloud. A weighted efficiency index query interface 189 may also be provided on user interface 180 to enable a user to calculate other weighted efficiency indexes that may span multiple clouds. For instance, a user may input a query to calculate and display a weighted efficiency index for resources assigned to any number of particular tags and/or project identifiers. Specifically, resource utilization metrics and/or cost data may be aggregated, grouped, and/or filtered based on resources assigned to a particular tag and/or project identifier.

The project identifiers assigned to resources may be identified from private resource utilization metrics 134. In some implementations, tags may be mapped to a project such that tags associated with the identified project identifiers may also be identified. Tags may also be associated with cost data 174 as described above, and thus may be identified from cost data 174. The identified tags and project identifiers may be uploaded from metric store 190 into efficiency calculator 150. Efficiency calculator may calculate a weighted efficiency index from the queried data using the identified tags and/or project identifiers, and the calculated weighted efficiency index 182 may be displayed on user interface 180.

Figure 3:
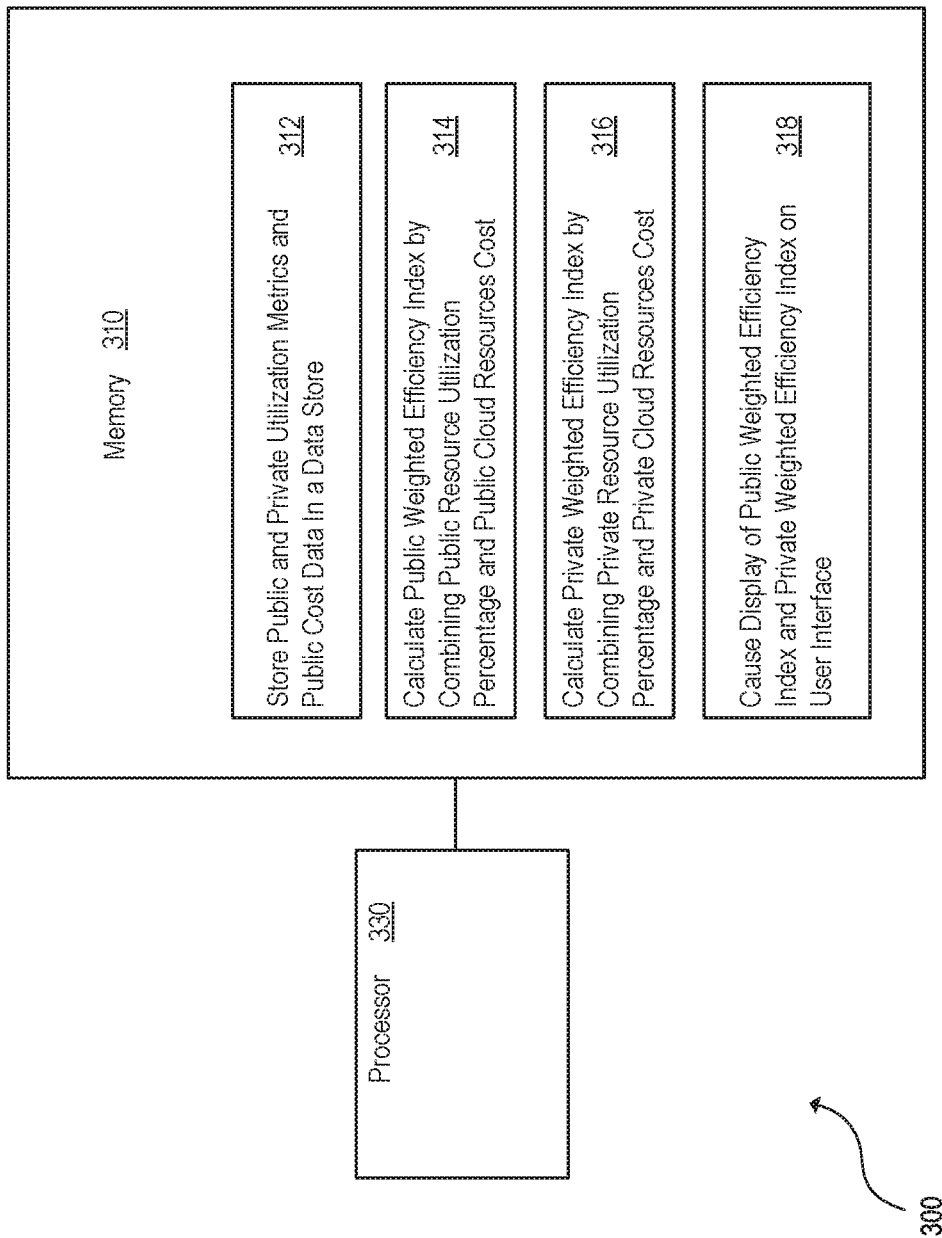
FIG. 3 is an example system for calculating a public weighted efficiency index and a private weighted efficiency index to be displayed on a user interface.

FIG. 3 is an example system 300 for calculating a public weighted efficiency index and a private weighted efficiency index to display on a user interface. FIG. 3 may include physical processor 330 and memory 310. Memory 310 may include machine-readable instructions to be executed by processor 330.

Specifically, memory 310 may include instructions 312, that, when executed by processor 330, cause the processor to store utilization metrics and cost data in a data store, such as metric store 190 of FIG. 1. The utilization metrics may include a public resource utilization metric that indicates a usage of a public resource in a public cloud. In an example, instructions 312 may cause processor 330 to fetch the public resource utilization metric from public cloud 170 via public cloud collector 112 of FIG. 1, and store the fetched public resource utilization metric in metric store 190 of FIG. 1.

The cost data to be stored may include a public cloud resource cost that indicates a cost of the public resource usage. In an example, instructions 312 may cause processor 330 to fetch the public cloud resource cost from public cloud 170 via public cloud collector 112 of FIG. 1, and store the fetched public cloud resource cost in metric store 190 of FIG. 1.

The utilization metrics may include a private resource utilization metric that indicates a usage of a private resource in a private cloud. In an example, instructions 312 may cause processor 330 to collect the private resource utilization metric from private cloud 130 via collector agents 120 of FIG. 1, and store the fetched private resource utilization metric in metric store 190 of FIG. 1.

Memory 310 may further include instructions 314 to calculate a public weighted efficiency index by combining a public resource utilization percentage and a public cloud resources cost. As described above, the public resource utilization percentage may be determined from the stored public resource utilization metric weighted by a deviation from an ideal resource utilization percentage.

Memory 310 may also include instructions 316 to calculate a private weighted efficiency index by combining a private resource utilization percentage and a private cloud resources cost. The private cloud resources cost may indicate a cost of resources from a private cloud and may be calculated, e.g. by efficiency calculator 150 of FIG. 1, from the private resource utilization metric and a cost to private utilization ratio. The cost to private utilization ratio may indicate a rate of cost for a particular resource. The cost to private utilization ratio may be stored, e.g. within utilization rates store 140 of FIG. 1, and in an example, may be inputted by a user, e.g. through user interface 180 of FIG. 1. The private cloud resource cost may be calculated from the cost to private utilization ratio and the private resource utilization metric.

The private weighted efficiency index may be calculated from the private cloud resources cost and a private resource utilization percentage. As described above, the private resource utilization percentage may be determined from the stored private resource utilization metric weighted by a deviation from an ideal resource utilization percentage. Memory 310 may include instructions 318 to cause display of the calculated private weighted efficiency index, and the calculated public weighted efficiency index, on a user interface.

Figure 4:
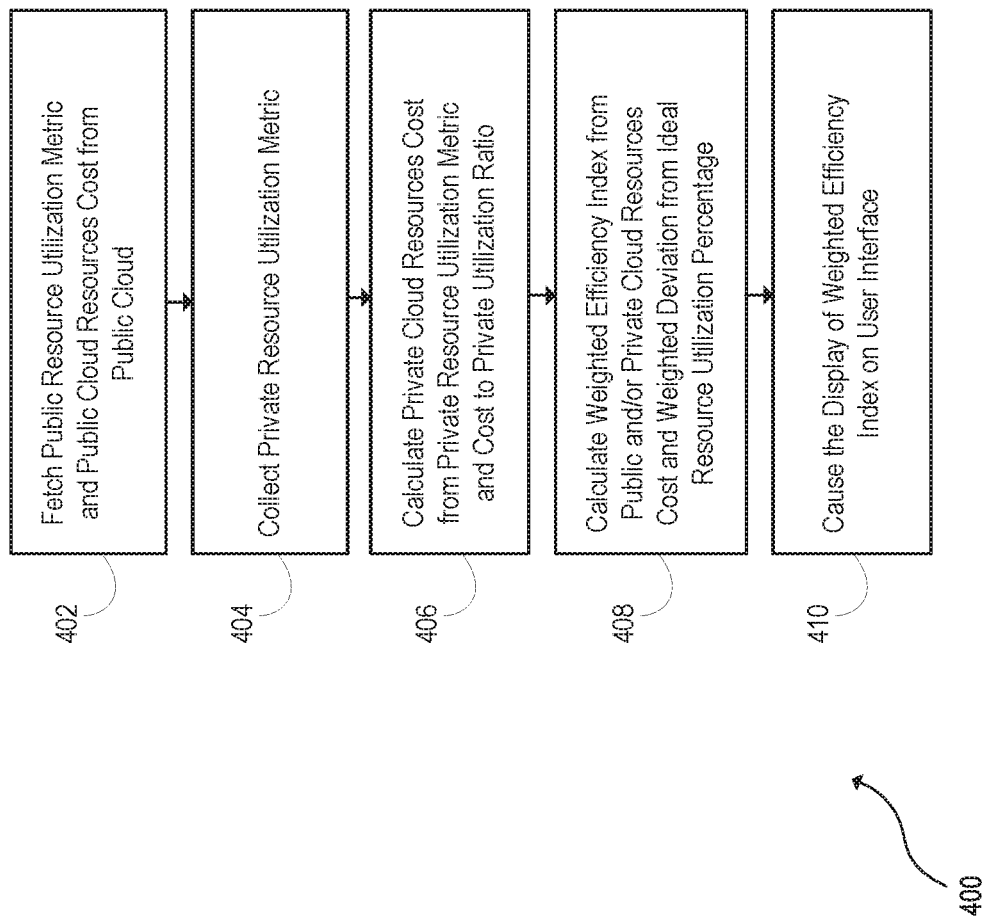
FIG. 4 is a flowchart illustrating a method for calculating a weighted efficiency index.

FIG. 4 is a flowchart illustrating a method 400 for calculating a weighted efficiency index. Although execution of method 400 is described below with reference to system 100, other suitable components for execution of method 400 may be utilized. Additionally, the components for executing method 400 may spread among multiple devices. Method 400 may be implemented in the form of executable instructions stored on a machine-readable storage medium and/or in the form of electronic circuitry, e.g. hardware. In some examples, steps of method 400 may be executed substantially concurrently or in a different order than shown in FIG. 4. In some examples, method 400 may include more or less steps than are shown in FIG. 4. In some examples, some of the steps of method 400 may, at certain times, be ongoing and/or may repeat.

At block 402, a public resource utilization metric and a public cloud resources cost may be fetched from a public cloud. A public cloud may be on-boarded such that the public cloud is securely connected to analytics system 110. The public resource utilization metric may indicate a usage of a public resource in the on-boarded public cloud and the public cloud resources cost may indicate a cost of the public resource usage. In an example, public resource utilization metrics and the public cloud resources cost may be fetched from any number of on-boarded public clouds 170 by public cloud collector 112, and the fetched resource utilization metrics and the public cloud resources costs may be stored within metric store 190.

At block 404, a private resource utilization metric may be collected. The private resource utilization metric may indicate a usage of a private resource in private cloud 130. For example, the private resource utilization metric may be collected by collector agents 120 deployed within platforms 132 of private cloud 130. Private resource utilization metrics may be stored within metric store 190 and, as described in the example above, may be aggregated by aggregator 160 prior to being stored within metric store 190.

At block 406, a private cloud resources cost may be calculated from a private resource utilization metric and a cost to private utilization ratio. The cost to private utilization ratio may indicate a rate of cost for a particular resource. The cost to private utilization ratio may be stored, e.g. within cost to utilization rates store 140 of FIG. 1, and in an example, may be inputted by a user, e.g. through user interface 180 of FIG. 1. By combining the cost to private utilization ratio and the private resource utilization metric, the private cloud resources cost may be calculated.

At block 408, a weighted efficiency index may be calculated from a public cloud resources cost and/or a private cloud resources cost and a weighted deviation from an ideal resource utilization percentage. As described above, the resource utilization percentage may be determined from a public resource utilization metric weighted by a deviation from an ideal resource utilization percentage, and/or a private resource utilization metric weighted by a deviation from the ideal resource utilization percentage. In some implementations, a public weighted efficiency index may be calculated from the public cloud resources cost and the ideal resource utilization percentage as determined from the public resource utilization metric weighted by a deviation from the ideal resource utilization percentage. In some implementations, a private weighted efficiency index may be calculated from the private cloud resources cost and the ideal resource utilization percentage as determined from the private resource utilization metric weighted by a deviation from the ideal resource utilization percentage.

At block 410, the weighted efficiency index may be displayed on a user interface, e.g. user interface 180. For example, a public weighted efficiency index and a private weighted efficiency index may be displayed on the user interface. In some implementations, an efficiency index for each utilized cloud may be displayed and any number of public weighted efficiency indexes and any number of private weighted efficiency indexes may be displayed.

Figure 5:
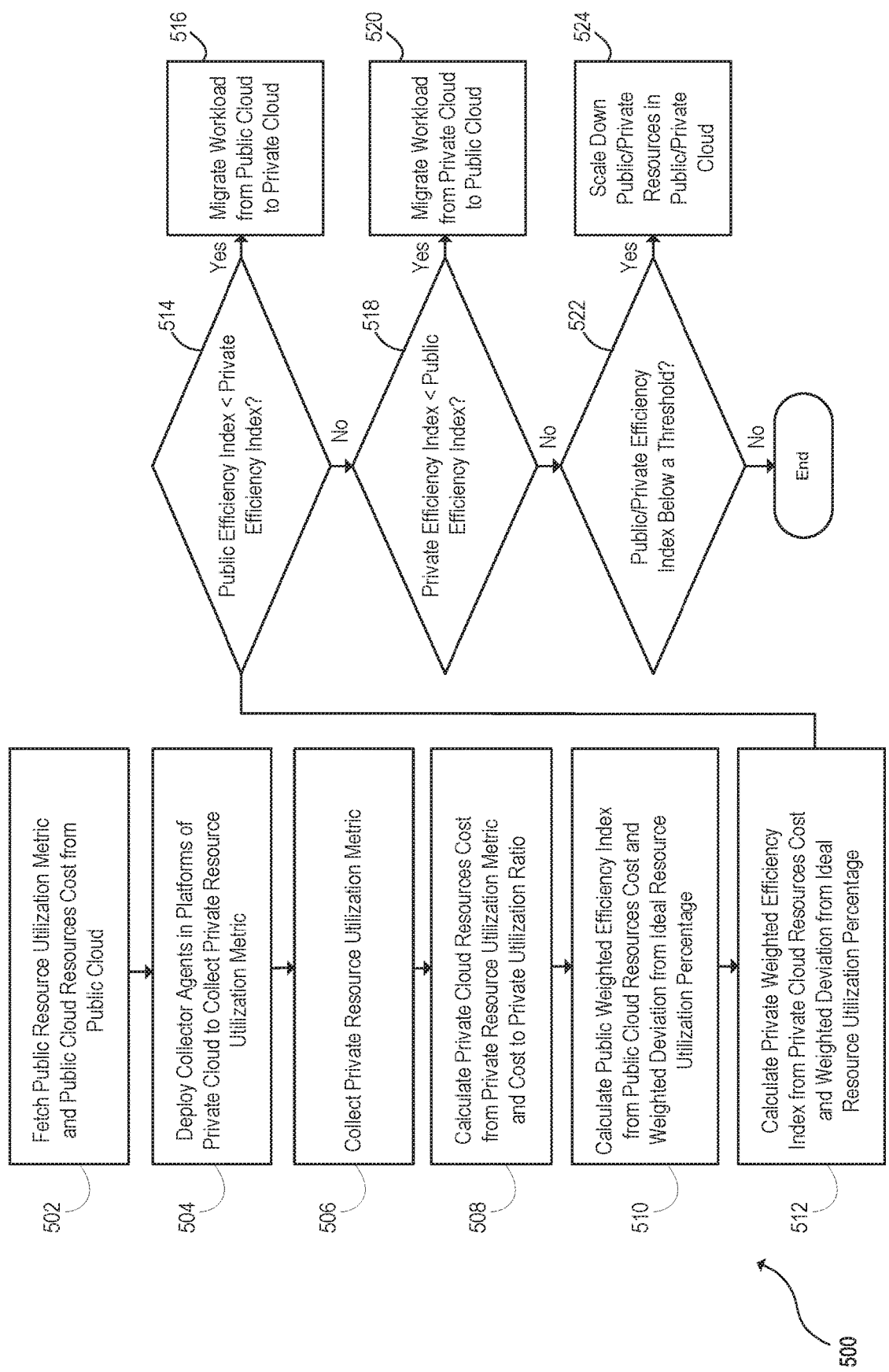
FIG. 5 is a flowchart illustrating a method for managing resources from a calculated public weighted efficiency index and a calculated private weighted efficiency index.

FIG. 5 is a flowchart illustrating a method 500 for calculating a public weighted efficiency index and a private weighted efficiency index. Although execution of method 500 is described below with reference to system 100, other suitable components for execution of method 500 may be utilized. Additionally, the components for executing method 500 may spread among multiple devices. Method 500 may be implemented in the form of executable instructions stored on a machine-readable storage medium and/or in the form of electronic circuitry, e.g. hardware. In some examples, steps of method 500 may be executed substantially concurrently or in a different order than shown in FIG. 5. In some examples, method 500 may include more or less steps than are shown in FIG. 5. In some examples, some of the steps of method 500 may, at certain times, be ongoing and/or may repeat.

At block 502, a public resource utilization metric and a public cloud resources cost may be fetched from a public cloud. The public resource utilization metric may indicate a usage of a public resource in an on-boarded public cloud and the public cloud resources cost may indicate a cost of the public resource usage. In an example, public resource utilization metrics and the public cloud resources cost may be fetched from any number of on-boarded public clouds 170 by public cloud collector 112, and the fetched resource utilization metrics and the public cloud resources costs may be stored within metric store 190.

At block 504, collector agents may be deployed in platforms of a private cloud to collect private resource utilization metrics. For instance, collector agents 120 may be deployed to collect private resource utilization metrics 134 from private cloud 130. The private resource utilization metrics 134 may indicate a usage of private cloud resources, which may include how many platforms are allocated in the private cloud and for what length of time the virtual machines were utilized; how much memory, and/or processing resources were utilized by each allocated platform in the private cloud; how much data was sent and/or received by an allocated platform in the private cloud; a combination thereof; and/or other factors related to resources utilized in a private cloud.

At block 506, the private resource utilization metrics may be collected by collector agents 120. In some implementations, the collected private resource utilization metrics and fetched public resource utilization metrics may be stored within metric store 190.

At block 508, a private cloud resources cost may be calculated from the private resource utilization metric and a cost to private utilization ratio. The cost to private utilization ratio may indicate a rate of cost for a particular resource. The cost to private utilization ratio may be stored, e.g. within cost to utilization rates store 140 of FIG. 1, and in an example, may be inputted by a user, e.g. through user interface 180 of FIG. 1.

At block 510, a public weighted efficiency index may be calculated from a public cloud resources cost and a weighted deviation from an ideal resource utilization percentage. As described above, the public resource utilization percentage may be determined from the public resource utilization metric weighted by a deviation from an ideal resource utilization percentage.

At block 512, a private weighted efficiency index may be calculated from a private cloud resources cost and a weighted deviation from an ideal resource utilization percentage. As described above, the private resource utilization percentage may be determined from the private resource utilization metric weighted by a deviation from an ideal resource utilization percentage.

At block 514 it may be determined whether a public weighted efficiency index associated with a utilized public cloud is less than a private weighted efficiency index associated with a utilized private cloud. A weighted efficiency index may indicate a resource utilization efficiency relative to cost, and thus a lower weighted efficiency index may indicate a less efficient utilization of resources relative to cost. Where it is determined that the public weighted efficiency index is less than the private weighted efficiency index ("yes" at block 514), a workload may be dynamically migrated at block 516 from the public cloud associated with the public weighted efficiency index to the private cloud associated with the private weighted efficiency index. In some implementations, the workload may be dynamically migrated from the public cloud to the private cloud where the public weighted efficiency index is less than the private weighted efficiency index by a threshold.

Where it is not determined that the public weighted efficiency index is less than the private weighted efficiency index ("no" at block 514), method 500 continues to block 518, where it may be determined whether the private efficiency index is less than the public efficiency index, and, in some example, whether the private weighted efficiency index is less than the public weighted efficiency index by a threshold. Where it is determined that the private weighted efficiency index is less than the public weighted efficiency index ("yes" at block 518), a workload may be dynamically migrated from the private cloud associated with the private weighted efficiency index to the public cloud associated with the public weighted efficiency index. Accordingly, workloads may be dynamically migrated between clouds such that workloads are supported by cloud resources more efficiently.

At block 522, it may be determined whether a public and/or private weighted efficiency index is a below a threshold. Where it is determined that a weighted public and/or private efficiency index is below a threshold, respective public and/or private resources of the public and/or private cloud associated with the weighted efficiency index below the threshold may be scaled down at block 524. For instance, the size of platforms of the cloud may be reduced to have less resources, i.e. memory, storage, network bandwidth, etc., and/or the number of platforms of the cloud may be reduced.

Figure 6:
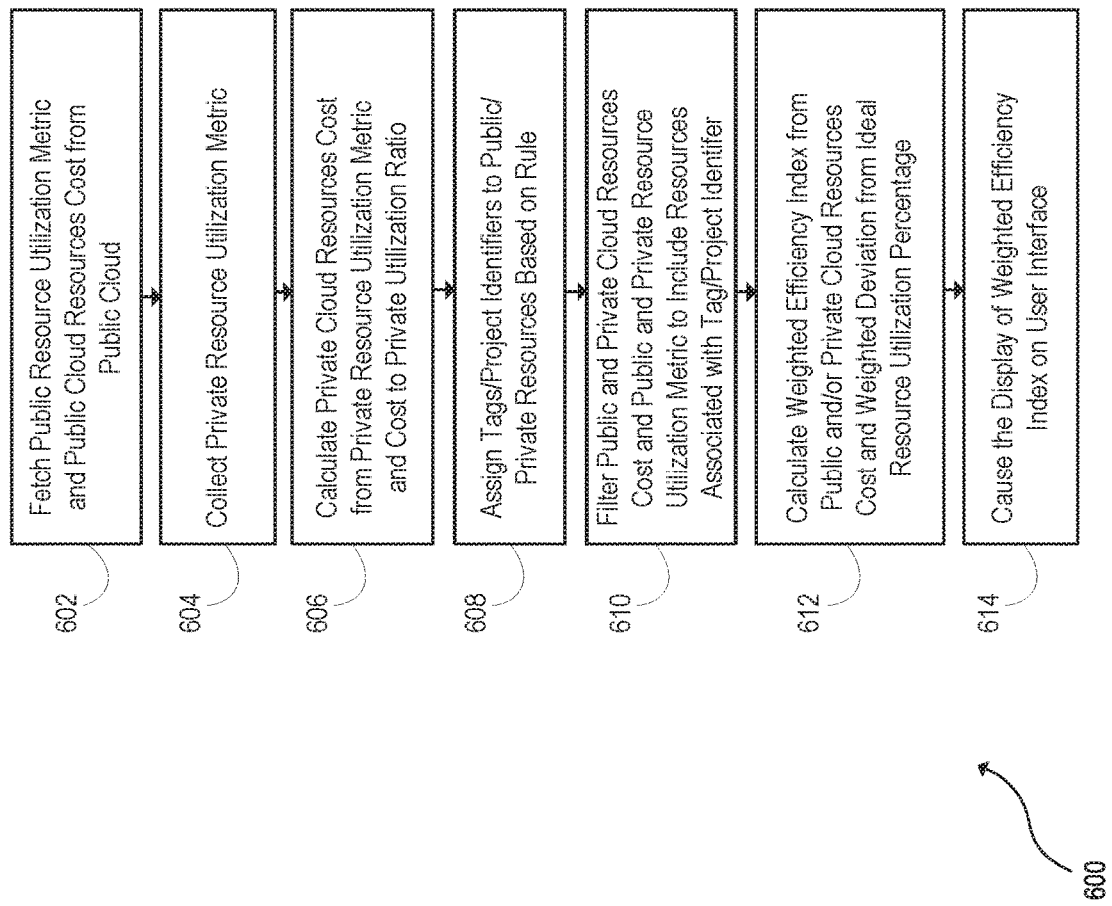
FIG. 6 is a flowchart illustrating a method for calculating a weighted efficiency index.

FIG. 6 is a flowchart illustrating a method 600 for calculating a weighted efficiency index for tagged resources. Although execution of method 600 is described below with reference to system 100, other suitable components for execution of method 600 may be utilized. Additionally, the components for executing method 600 may spread among multiple devices. Method 600 may be implemented in the form of executable instructions stored on a machine-readable storage medium and/or in the form of electronic circuitry, e.g. hardware. In some examples, steps of method 600 may be executed substantially concurrently or in a different order than shown in FIG. 6. In some examples, method 600 may include more or less steps than are shown in FIG. 6. In some examples, some of the steps of method 600 may, at certain times, be ongoing and/or may repeat.

At block 602, a public resource utilization metric and a public cloud resources cost may be fetched from a public cloud. A public cloud may be on-boarded such that the public cloud is securely connected to analytics system 110. A public resource utilization metric may indicate a usage of a public resource in the on-boarded public cloud and a public cloud resources cost may indicate a cost of the public resource usage. In an example, public resource utilization metrics 172 and a public cloud resources cost 174 may be fetched from any number of on-boarded public clouds 170 by public cloud collector 112, and the fetched resource utilization metrics 172 and the public cloud resources 174 costs may be stored within metric store 190.

At block 604, private resource utilization metrics 134 may be collected. A private resource utilization metric may indicate a usage of private resources in private cloud 130. The private resource utilization metrics 134 may be stored within metric store 190 and, as described in the example above, may be aggregated by aggregator 160 prior to being stored within metric store 190.

At block 606, a private cloud resources cost may be calculated from a private resource utilization metric and a cost to private utilization ratio. The cost to private utilization ratio may indicate a rate of cost for a particular resource. The cost to private utilization ratio may be stored, e.g. within cost to utilization rates store 140 of FIG. 1, and in an example, may be inputted by a user, e.g. through user interface 180 of FIG. 1. By combining the cost to private utilization ratio and the private resource utilization metric, the private cloud resources cost may be calculated.

By assigning tags to resources and/or assigning project identifiers to resources, the relative utilization efficiencies of resources of different parameters may be determined. At block 608, tags and/or project identifiers may be assigned to public and/or private cloud resources. In some implementations, tags and/or project identifiers may be assigned to resources by tag manager 196. A user, e.g. through tag management interface 186 or project management interface 188, may instruct tag manager 196 to assign tags and/or project identifiers to resources. In some implementations, tag manager 196 may assign tags to resources according to rules, and a user may create rules to map resources having a particular characteristic, state, feature, etc., to a particular tag and/or project identifier. A user may create rules to map particular tags to particular project identifiers such that resources assigned to a tag mapped to a particular project are allocated to that project.

At block 610, the public and private cloud resources costs and/or the public and private resource utilization metrics may be filtered to include resources associated with a particular tag and/or a particular project identifier. A user may utilize weighted efficiency index query interface 189 to query for a weighted utilization index associated with resources assigned to a particular tag and/or assigned to a particular project. The user may select a particular tag or a particular project and the fetched/collected costs and metrics may be filtered to include utilized resources having the particular tag or project identifier associated with the project, and associated resource costs. Thus, data may be filtered according to user queries.

At block 612, a weighted efficiency index may be calculated from a public cloud resources cost, a private cloud resources cost, or any combination thereof, and a weighted deviation from an ideal resource utilization percentage. As described above, the resource utilization percentage may be determined from a public resource utilization metric weighted by a deviation from an ideal resource utilization percentage, a private resource utilization metric weighted by a deviation from the ideal resource utilization percentage, or any combination thereof. In some implementations, a public weighted efficiency index may be calculated from the public cloud resources cost and the ideal resource utilization percentage as determined from the public resource utilization metric weighted by a deviation from the ideal resource utilization percentage. In some implementations, a private weighted efficiency index may be calculated from the private cloud resources cost and the ideal resource utilization percentage as determined from the private resource utilization metric weighted by a deviation from the ideal resource utilization percentage.

A weighted efficiency index that indicates the relative utilization of resources across multiple clouds may also be calculated. For instance, a user may input a query to calculate and display a weighted efficiency index for resources assigned to any number of particular tags and/or project identifiers. Resource utilization metrics and/or cost data may be aggregated, grouped, and/or filtered based on resources assigned to a particular tag and/or project identifier, and the weighted efficiency index may be calculated from the filtered cloud resources costs and the ideal resource utilization percentage as determined from the filtered resource utilization metrics weighted by a deviation from an ideal resource utilization percentage.

At block 614, the weighted efficiency index may be displayed on a user interface, e.g. user interface 180. For example, a public weighted efficiency index and a private weighted efficiency index may be displayed on the user interface. In some implementations, an efficiency index for each utilized cloud may be displayed and any number of public weighted efficiency indexes and any number of private weighted efficiency indexes may be displayed. In some implementations, a weighted efficiency index that indicates the relative utilization of resources across multiple clouds may be displayed.

Figure 7:
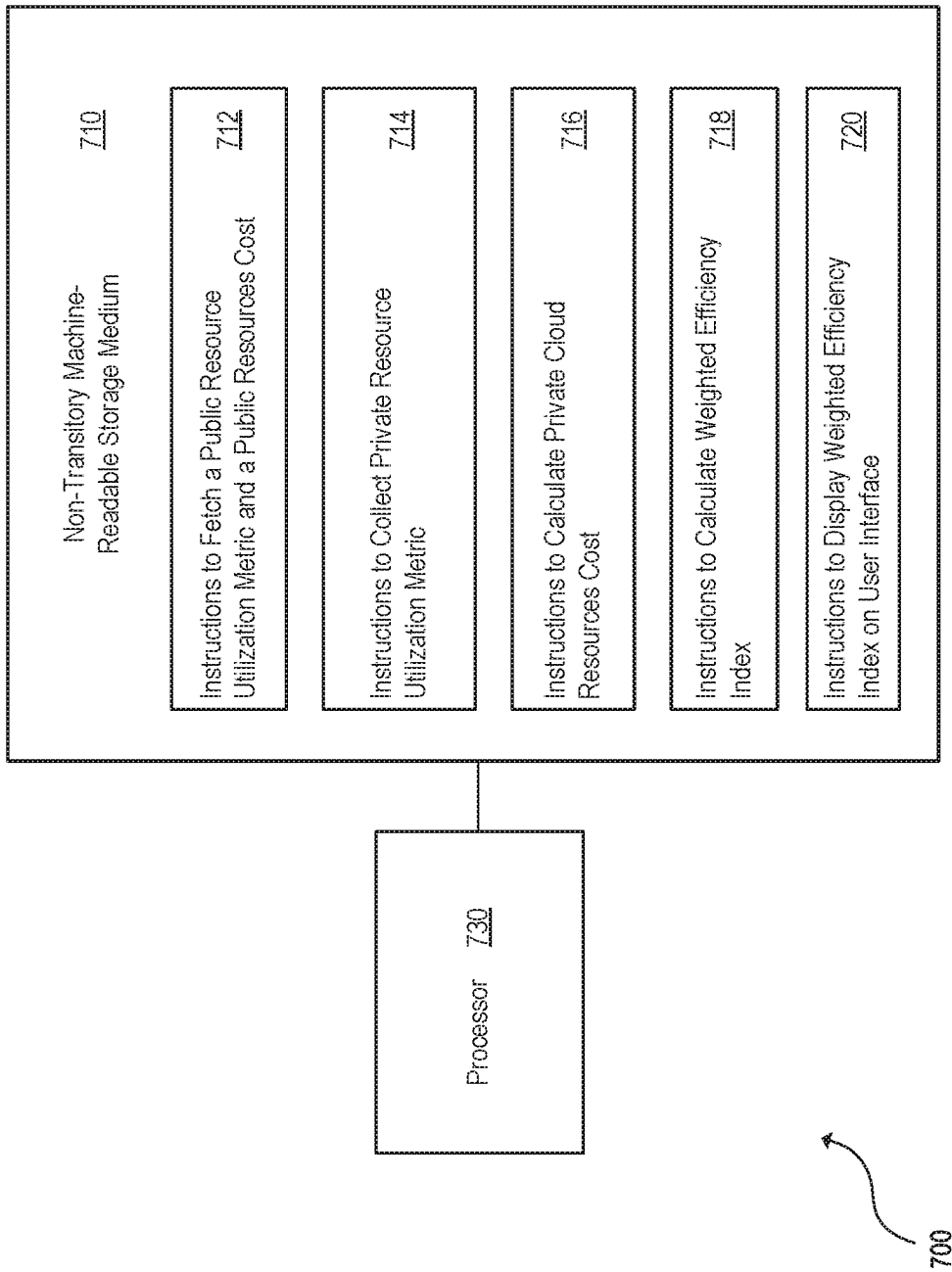
FIG. 7 is a block diagram of an example non-transitory machine-readable medium for displaying a public weighted efficiency index and a private weighted efficiency index on a user interface.
Figure 8:
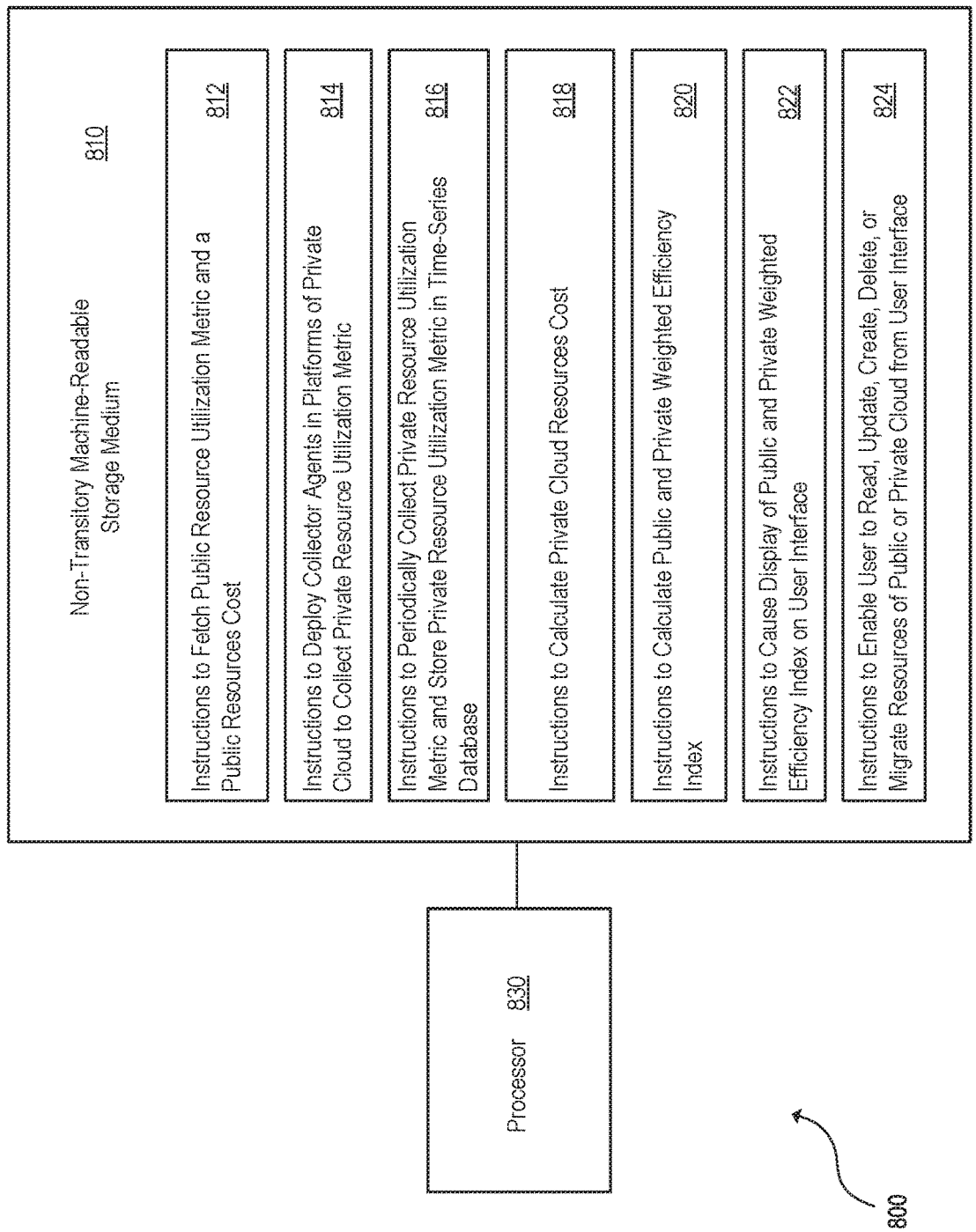
FIG. 8 is a block diagram of an example non-transitory machine-readable medium for displaying a public weighted efficiency index and a private weighted efficiency index on a user interface.
Figure 9:
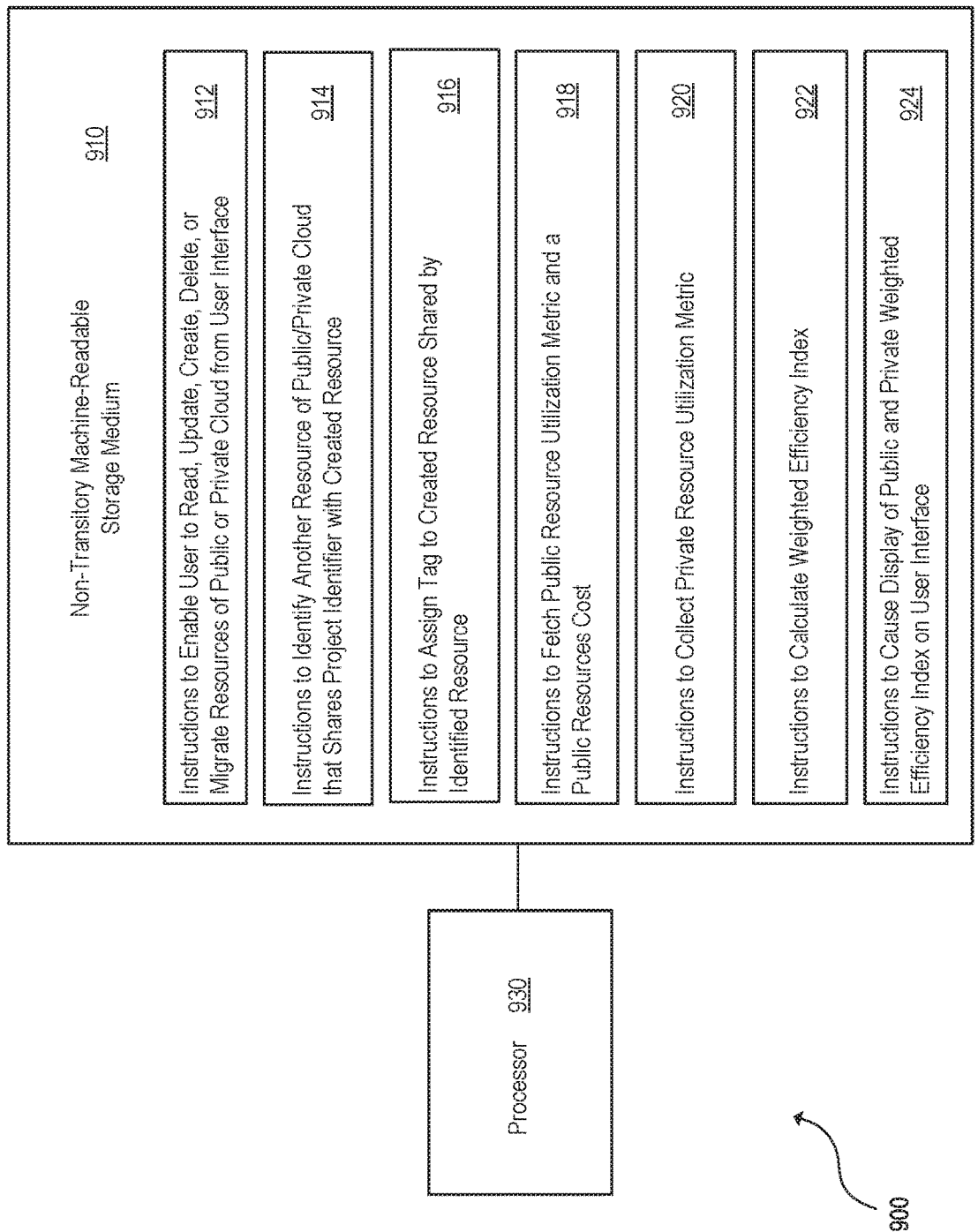
FIG. 9 is a block diagram of an example non-transitory machine-readable medium for displaying a weighted efficiency index on a user interface.

FIG. 7, FIG. 8, and FIG. 9 are block diagrams of example non-transitory machine-readable mediums for displaying a public weighted efficiency index and a private weighted efficiency index on a user interface. Non-transitory machine-readable storage medium 710 of FIG. 7 may be coupled to a processor, e.g. processor 730, for deploying an image on a group of target servers. Similarly, non-transitory machine-readable storage medium 810 of FIG. 8 and non-transitory machine-readable storage medium 910 of FIG. 9 may be coupled to a processor, e.g. processor 830 or processor 930 respectively, for calculating a weighted efficiency index. Non-transitory machine-readable storage medium 710, non-transitory machine-readable storage medium 810, and non-transitory machine-readable storage medium 910 may include executable instructions thereon. In the foregoing discussion, collector agents 120, efficiency calculator 150, aggregator 160, and tag manager 196 were described as combinations of hardware and software/firmware. Referring to FIG. 7, the software/firmware may be processor executable instructions 712-720 stored on a non-transitory machine-readable storage medium 710 and the hardware may include a processor 730 for executing those instructions. Referring to FIG. 8, the software/firmware may be processor executable instructions 812-824 stored on a non-transitory machine-readable storage medium 810 and the hardware may include a processor 830 for executing those instructions. Referring to FIG. 9, the software/firmware may be processor executable instructions 912-924 stored on a non-transitory machine-readable storage medium 910 and the hardware may include a processor 930 for executing those instructions.

Non-transitory machine-readable storage medium 710, non-transitory machine-readable storage medium 810, or non-transitory machine-readable storage medium 910 may be implemented in a single device or distributed across devices. Likewise, processor 730, processor 830, or processor 930 may represent any number of physical processors capable of executing instructions stored by non-transitory machine-readable storage medium 710, non-transitory machine-readable storage medium 810, or non-transitory machine-readable storage medium 910, respectively. Further, non-transitory machine-readable storage medium 710, non-transitory machine-readable storage medium 810, or non-transitory machine-readable storage medium 910 may be fully or partially integrated in the same device as processor 730, processor 830, or processor 930 respectively, or it may be separate but accessible to that device.

In one example, the program instructions may be part of an installation package that when installed can be executed by processor 710, processor 810, or processor 910 to calculate and display a weighted efficiency index. In this case, non-transitory machine-readable storage medium 710, non-transitory machine-readable storage medium 810, or non-transitory machine-readable storage medium 910 may be a portable medium such as a floppy disk, CD, DVD, or flash drive or a memory maintained by a server from which the installation package can be downloaded and installed. In another example, the program instructions may be part of an application or applications already installed. Here, non-transitory machine-readable storage medium 710, non-transitory machine-readable storage medium 810, or non-transitory machine-readable storage medium 910 may include a hard disk, optical disk, tapes, solid state drives, RAM, ROM, EEPROM, or the like.

Processor 730, processor 830, or processor 930 may be a central processing unit (CPU), graphics processing unit (GPU), microprocessor, and/or other hardware device suitable for retrieval and execution of instructions stored in non-transitory machine-readable storage medium 710, non-transitory machine-readable storage medium 810 or non-transitory machine-readable storage medium 910). Processor 730 may fetch, decode, and execute program instructions 712-720, and/or other instructions. Similarly, processor 830 may fetch, decode, and execute program instructions 812-824 and processor 930 may fetch, decode, and execute program instructions 912-924. As an alternative or in addition to retrieving and executing instructions, processor 630 may include at least one electronic circuit comprising a number of electronic components for performing the functionality of instructions 712-720, and/or other instructions. Similarly, processor 830 may include at least one electronic circuit comprising a number of electronic components for performing the functionality of instructions 812-824, and/or other instructions, and processor 930 may include at least one electronic circuit comprising a number of electronic components for performing the functionality of instructions 912-924.

Instructions 712, when executed, may cause processor 730 to fetch a public resource utilization metric and a public resources cost. The public resource utilization metric may indicate a usage of a public resource in an on-boarded public cloud and the public cloud resources cost may indicate a cost of the public resource usage.

Instructions 714, when executed, may cause processor 730 to collect a private resource utilization metric. The private resource utilization metric may indicate a usage of a private resource in a private cloud. The private resource utilization metric may be collected by collector agents deployed within platforms of the private cloud. Private resource utilization metrics may be stored, and, as described above, may be aggregated prior to being stored.

Instructions 716, when executed, may cause processor 730 to calculate a private cloud resources cost. The private cloud resources cost may be calculated from a private resource utilization metric and a cost to private utilization ratio. The cost to private utilization ratio may indicate a rate of cost for a particular resource. The cost to private utilization ratio may be stored, and in an example, may be inputted by a user, e.g. through a user interface.

Instructions 718, when executed, may cause processor 730 to calculate a weighted efficiency index. For example, a public weighted efficiency index may be calculated from a public cloud resources cost and a weighted deviation from an ideal resource utilization percentage. As described above, the public resource utilization percentage may be determined from the public resource utilization metric weighted by a deviation from an ideal resource utilization percentage. As an example, a private weighted efficiency index may be calculated from a private cloud resources cost and a weighted deviation from an ideal resource utilization percentage. As described above, the private resource utilization percentage may be determined from the private resource utilization metric weighted by a deviation from an ideal resource utilization percentage.

Instructions 720, when executed, may cause processor 730 to cause display of the calculated weighted efficiency index on a user interface. An efficiency index for each utilized cloud may be displayed and any number of public weighted efficiency indexes and any number of private weighted efficiency indexes may be displayed.

FIG. 8 is an example of a non-transitory machine-readable medium having instructions for calculating a public and private weighted efficiency index. Instructions 812, when executed, may cause processor 830 to fetch a public resource utilization metric and a public resources cost. The public resource utilization metric may indicate a usage of a public resource in an on-boarded public cloud and the public cloud resources cost may indicate a cost of the public resource usage.

Instructions 814, when executed, may cause processor 830 to deploy collector agents in platforms of a private cloud to collect private resource utilization metrics. The private resource utilization metrics may indicate a usage of private cloud resources, which may include how many platforms are allocated in the private cloud and for what length of time the platforms were utilized; how much memory, and/or processing resources were utilized by each allocated platform in the private cloud; how much data was sent and/or received by an allocated platform in the private cloud; a combination thereof; and/or other factors related to resources utilized in a private cloud. The collector agents may be implemented as hardware or a combination of hardware and software/firmware for collecting data associated with cloud resource usage from the private cloud.

Instructions 816, when executed, may cause processor 830 to collect private resource utilization metrics, i.e. via the collector agents. The private resource utilization metric may indicate a usage of a private resource in a private cloud and may be collected periodically within predetermined intervals. The private resource utilization metrics may be stored in a data store such as a time-series database that tracks the time at which the private resource utilization metrics are collected. As described above, the private resource utilization metrics may be aggregated prior to being stored.

Instructions 818, when executed, may cause processor 830 to calculate a private cloud resources cost. The private cloud resources cost may be calculated from a private resource utilization metric and a cost to private utilization ratio. The cost to private utilization ratio may indicate a rate of cost for a particular resource. The cost to private utilization ratio may be stored, and in an example, may be inputted by a user, e.g. through a user interface.

Instructions 820, when executed, may cause processor 830 to calculate a public weighted efficiency index and a private weighted efficiency index. A public weighted efficiency index may be calculated from a public cloud resources cost and a weighted deviation from an ideal resource utilization percentage. As described above, the public resource utilization percentage may be determined from the public resource utilization metric weighted by a deviation from an ideal resource utilization percentage. A private weighted efficiency index may be calculated from a private cloud resources cost and a weighted deviation from an ideal resource utilization percentage. As described above, the private resource utilization percentage may be determined from the private resource utilization metric weighted by a deviation from an ideal resource utilization percentage.

Instructions 822, when executed, may cause processor 830 to cause display of the calculated public weighted efficiency index and/or the private weighted efficiency index on a user interface. An efficiency index for each utilized cloud may be displayed and any number of public weighted efficiency indexes and any number of private weighted efficiency indexes may be displayed.

Instructions 824, when executed, may cause processor 830 to enable a user to—from the user interface—create, read, update, delete, and/or migrate resources such as virtual machines and/or containers. Thus, weighted efficiency scores may indicate a relative utilization efficiency of cloud resources relative to cost, and a user may manage cloud resources from the user interface responsive to the user interface displaying the weighted efficiency scores.

FIG. 9 is an example of a non-transitory machine-readable medium having instructions for calculating a weighted efficiency index. Instructions 912, when executed, may cause processor 930 to enable a user to manage resources, such as create, read, update, delete, and/or migrate resources in a public and/or private cloud. In some implementations, a user may manage resources in public cloud 170 and/or private cloud 130 through deployment interface 184 of user interface 180.

In an example, a resource created in a public or private cloud may be assigned a project identifier upon the creation of the resource. The project identifier may associate the created resource with a particular project. Instructions 914, when executed, may cause processor 930 to identify another resource of public cloud 170 or private cloud 130 sharing a project identifier with the created resource. Instructions 916, when executed, may cause processor 930 to assign a tag to the created resource shared by the identified resource. Thus, instructions may be provided to cause a processor to populate tags across resources of the same project.

Instructions 918, when executed, may cause processor 930 to fetch a public resource utilization metric and a public resources cost. The public resource utilization metric may indicate a usage of a public resource assigned a tag and/or project identifier and the public cloud resources cost may indicate a cost of the public resource usage.

Instructions 920, when executed, may cause processor 930 to collect private resource utilization metrics, i.e. via collector agents. The private resource utilization metrics may indicate a usage of a private resource assigned a tag and/or project identifier and may be collected periodically within predetermined intervals. The private resource utilization metrics may be stored and may be aggregated prior to being stored.

Instructions 922, when executed, may cause processor 930 to calculate a weighted efficiency index. The weighted efficiency index may be calculated from the public and/or private cloud resources cost and a weighted deviation from an ideal resource utilization percentage as determined from the public and/or private resource utilization metrics. As described above, the weighted efficiency index may be a public weighted efficiency index that indicates the relative utilization efficiency of resources in a public cloud, a private weighted efficiency index that indicates the relative utilization efficiency of resources in a private cloud, or a weighted efficiency index that indicates the relative utilization of resources across multiple clouds. For example, a weighted efficiency index may indicate the relative utilization efficiency of resources across multiple clouds that share a particular tag and/or project identifier.

Instructions 924, when executed, may cause processor 930 to cause display of the calculated weighted efficiency index on a user interface. Any number of weighted efficiency indexes may be displayed.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method comprising:
fetching, by a processor-based analytics system, a public resource utilization metric from an on-boarded public cloud;
fetching, by the analytics system, a public resource cost from the on-boarded public cloud;
collecting, by the analytics system, a plurality of private resource utilization metrics from collector agents for a plurality of platforms deployed in a private cloud;
aggregating the plurality of private resource utilization metrics into one or more aggregated private resource metrics, wherein the private resource utilization metrics are aggregated based on commonalities between the platforms;
calculating, by the analytics system, a private resource cost based on an aggregated private resource utilization metric and an associated resource rate;
causing display, by the analytics system, of the public resource utilization metric and the aggregated private resource utilization metric; and
causing display, by the analytics system, of the public resource cost and the private resource cost.

2. The method of claim 1, further comprising causing display, by the analytics system, of a public weighted efficiency index that is calculated by multiplying the public resource cost and a corresponding public resource efficiency score, wherein the public resource efficiency score is based on how greatly the public resource utilization metric deviates from a predetermined ideal resource utilization.

3. The method of claim 2, wherein the public resource efficiency score is further based on a weight function that penalizes greater deviations of the public resource utilization metric from the predetermined public ideal resource utilization.

4. The method of claim 3, wherein the weight function is a logistic function.

5. The method of claim 2, further comprising causing display of a private weighted efficiency index that is calculated by multiplying the private resource cost and a corresponding private resource efficiency score, wherein the private resource efficiency score is based on how greatly of the private resource utilization metric deviates from a predetermined ideal private resource utilization.

6. The method of claim 2, further comprising:
fetching, by the analytics system, a second public resource utilization metric from a second on-boarded public cloud;
fetching, by the analytics system, a second public resource cost from the second on-boarded public cloud; and
causing display, by the analytics system, of a second public weighted efficiency index that is calculated by multiplying the second public resource cost and a second public resource efficiency score, wherein the second public resource efficiency score is based on how greatly the second public resource utilization metric deviates from a second predetermined ideal resource utilization.

7. The method of claim 1, wherein:
the plurality of private resource utilization metrics are aggregated based on like region, zone, or project.

8. The method of claim 1, wherein the associated resource rate includes an energy cost or a real estate cost.

9. The method of claim 1, wherein the public resource utilization metric relates to virtual machine utilization in the public cloud.

10. The method of claim 1, further comprising providing a user interface to create, read, update, delete, or migrate virtual machines or containers.

11. The method of claim 1, further comprising:
collecting a plurality of private resource utilization metrics including a processing unit utilization, a storage utilization, and a memory utilization;
calculating efficiency scores for each of the plurality of private resource utilization metrics based on how greatly each of the plurality of private resource utilization metrics deviate from a respective predetermined ideal resource utilization and aggregating the calculated efficiency scores; and
calculating a private weighted efficiency index based on the aggregation of the efficiency scores.

12. The method of claim 1, further comprising:
assigning each of one or more aggregated private resource metrics an aggregate identifier.

13. The method of claim 1, further comprising:
storing the one or more aggregated private resource metrics in a metric store, wherein the calculation of the private resource cost includes obtaining the aggregated private resource utilization metric from the metric store.

14. A method comprising:
fetching, by a processor-based analytics system, public resource utilization metrics indicative of utilization of public resources of an on-boarded public cloud;
fetching, by the analytics system, public resource costs from the on-boarded public cloud;
assigning, by the analytics system, one or more tags to the public resource utilization metrics or the public resource costs according to rules;
receiving, by the analytics system, a user-selected tag;
filtering, by the analytics system, the public resource utilization metrics and the public resource costs by the user-selected tag to one or more filtered public resource utilization metrics and one or more filtered public resource costs;
calculating, by the analytics system, a public weighted efficiency index based on the filtered public resource costs and how greatly the filtered public resource utilization metrics deviate from an associated predetermined ideal resource utilization; and
causing display, by the analytics system, of the public weighted efficiency index.

15. The method of claim 14, further comprising causing display, by the analytics system, of the filtered public resource utilization metrics and the filtered public resource costs.

16. The method of claim 14, wherein the rules are user-defined.

17. The method of claim 14, wherein the one or more tags relate to a line of business, an environment type, a project identifier, or a priority.

18. A method comprising:
collecting, by an analytics system, private resource utilization metrics from a private cloud, wherein the private resource utilization metrics relate to processing unit utilization, storage utilization, and memory utilization;
calculating, by the analytics system, private resource costs based on the private resource utilization metrics and associated resource rates;
assigning, by the analytics system, one or more tags to the private resource utilization metrics or the private resource costs according to rules;
receiving, by the analytics system, a user-selected tag;
filtering, by the analytics system, the private resource utilization metrics and the private resource costs by the user-selected tag to one or more filtered private resource utilization metrics and one or more filtered private resource costs;
calculating, by the analytics system, a private weighted efficiency index based on the filtered private resource costs and how greatly the filtered private resource utilization metrics deviate from an associated predetermined ideal resource utilization; and
causing display, by the analytics system, of the private weighted efficiency index.

19. The method of claim 18, wherein the one or more tags relate to a line of business, an environment type, a project identifier, or a priority.

20. The method of claim 18, wherein the private resource utilization metrics relate to processing unit utilization, storage utilization, and memory utilization in virtual machines.

* * * * *